Nov. 28, 1967     W. R. LORANG     3,354,810
SIMPLIFIED COFFEEMAKING MACHINE
Filed May 13, 1966     3 Sheets-Sheet 1
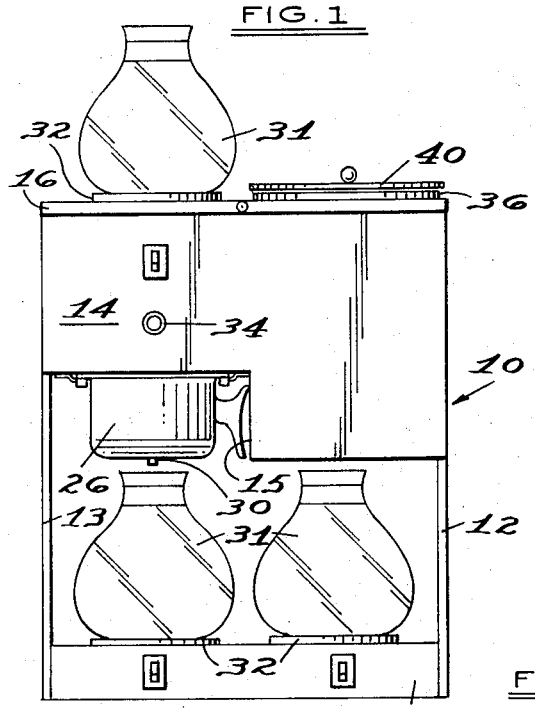
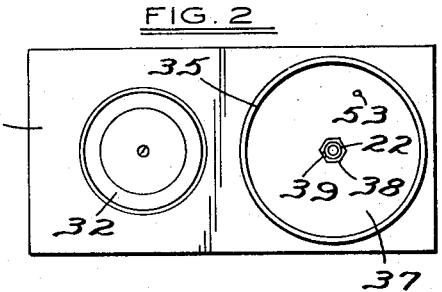
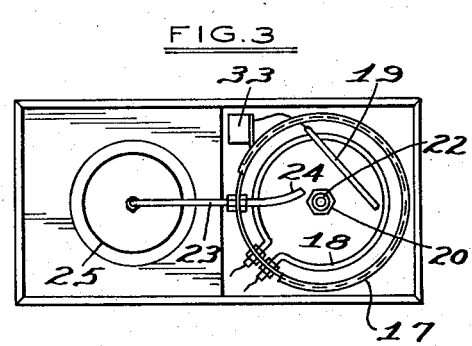
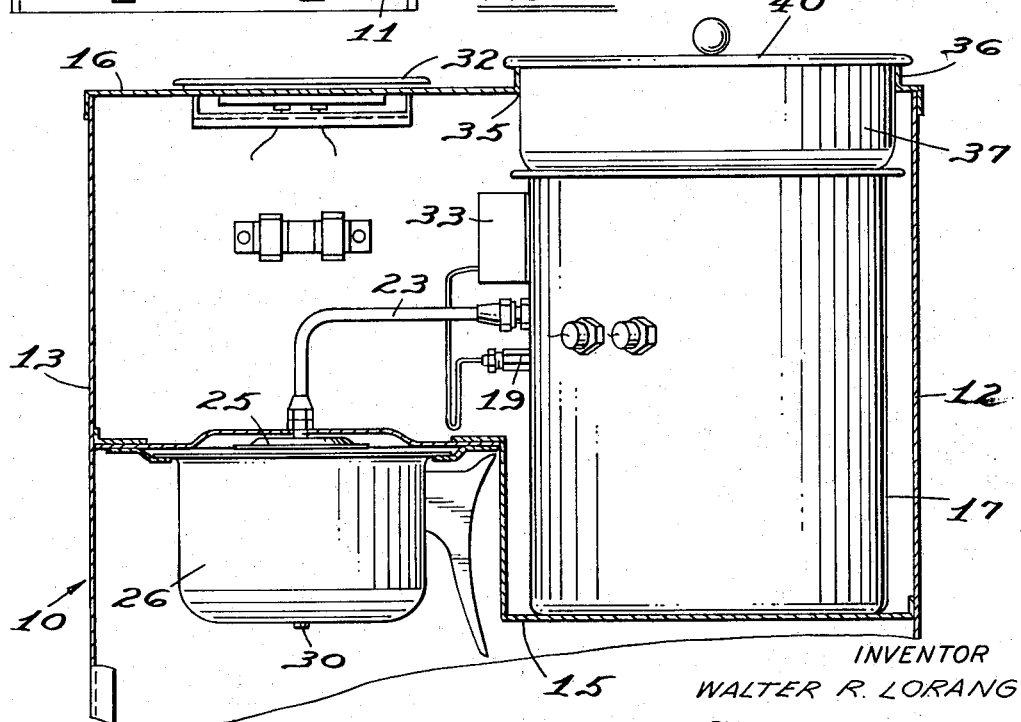
INVENTOR
WALTER R. LORANG
BY
*[signature]*
ATTORNEY Nov. 28, 1967  W. R. LORANG  3,354,810
SIMPLIFIED COFFEEMAKING MACHINE
Filed May 13, 1966  3 Sheets-Sheet 2

INVENTOR
WALTER R. LORANG
BY
*Lillian P. Sewald*
ATTORNEY

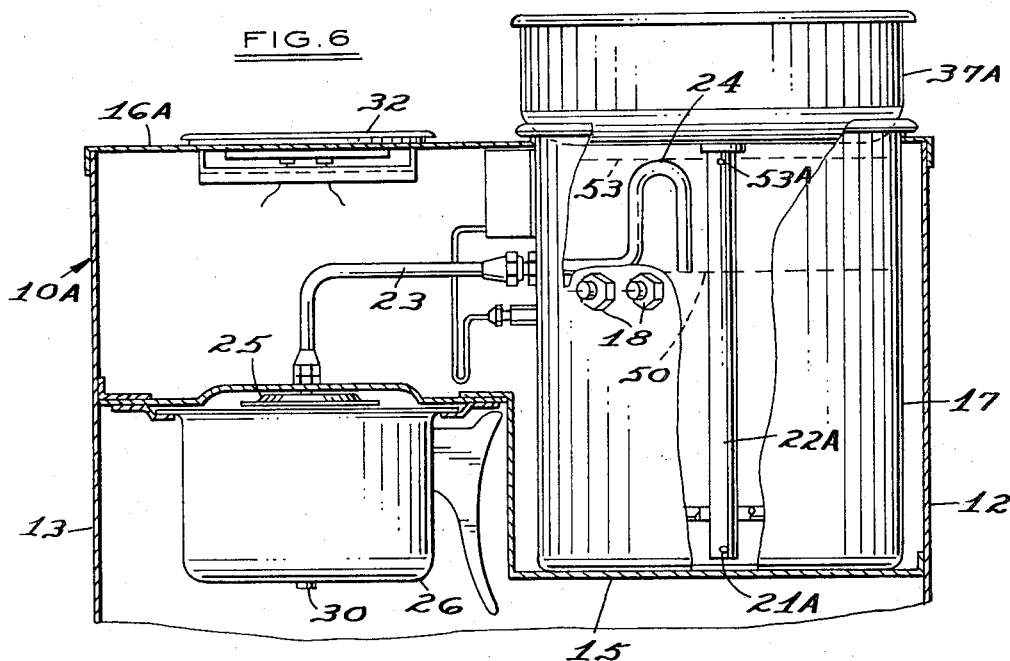
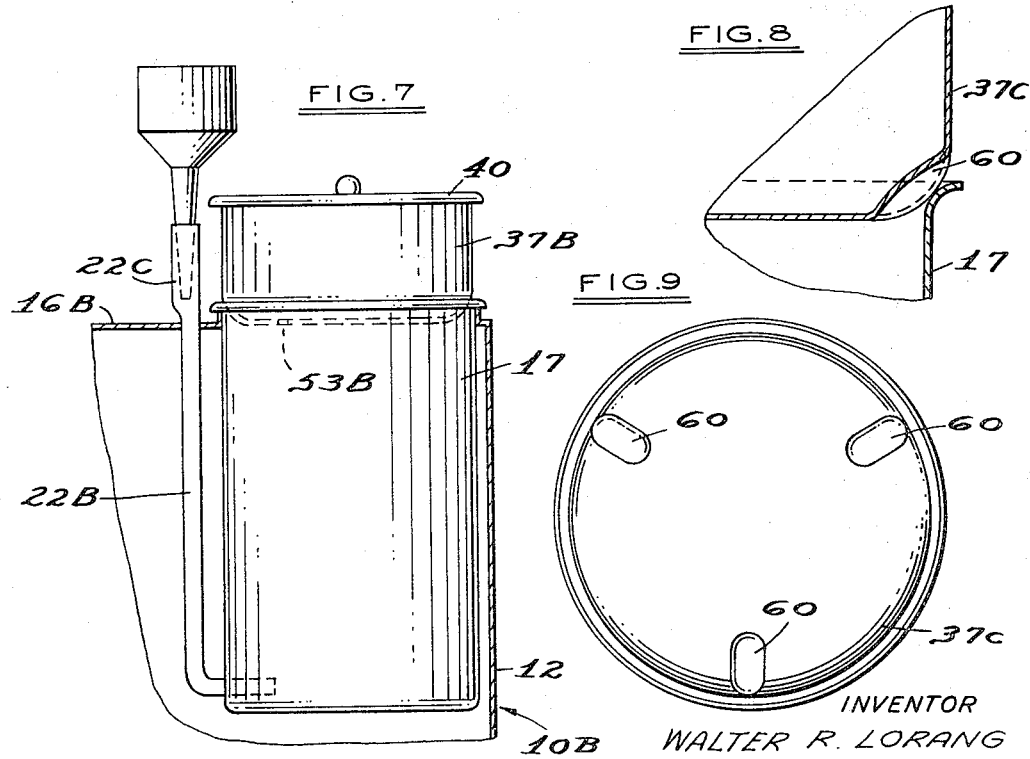

United States Patent Office 3,354,810
Patented Nov. 28, 1967

3,354,810
SIMPLIFIED COFFEEMAKING MACHINE
Walter R. Lorang, 2339 W. Maple Road,
Walled Lake, Mich. 48088
Filed May 13, 1966, Ser. No. 549,838
5 Claims. (Cl. 99—282)

ABSTRACT OF THE DISCLOSURE

A simplified coffeemaking machine having a lower open top reservoir can and a superposed batch water upper pan interconnected by a inlet pipe. The pan has a small aperture in its bottom which allows water vapor from the hot water in the can to rise into the pan. The pan condenses the vapor back to water and introduces it back to the can through the inlet pipe. The pan fits in and closes off an opening in the top of the cabinet so that no foreign matter may get into the can or the interior of the cabinet. The pan has a cover with an aperture which allows for a vacuum break.

The inlet pipe, outlet pipe, heating unit, and thermocouple are all connected inside and outside the can. This is facilitated by the fact that the can is open top. As water conditions are the main cause of trouble with water using devices, it is obvious that the device can be easily cleaned at frequent intervals by simply removing the pan from the can. The device can also have parts replaced and repaired very easily due to the fact that the can is open top.

---

This invention relates to coffeemaking machines and includes novel improvements, simplifications, and advantages in structure, part formation, assembly, operation, use, maintenance, repair, and replacement.

In the business of serving food, the importance of serving freshly brewed, quality, good tasting, and satisfying coffee cannot be overestimated. It is of greatest importance. Thus the means of making the coffee is also of the greatest importance. Many attempts have been made to provide fine coffee making machines, but the resulting machines have become complicated and expensive in structure, part formation, assembly, maintenance, repair, and replacement and also in use and operation. With the increased costs of supplies, overhead, taxes, and labor, these machines tend to defeat their purpose because they are too expensive and time consuming to maintain in proper clean operating conditon. They also take too much of the user's time to operate and some of them make too large a coffee batch so that it become old before it is used.

With the foregoing in view it is a primary object of the invention to provide a semi-automatic coffeemaking machine which makes batches of coffee of coffee flask size so that the coffee is always fresh and so that a full flask is always made.

An object of the invention is to provide a coffee machine which is inexpensive in that the parts are easily made or procured, their assembly readily accomplished, and their removal for cleaning or repair and replacement easily and quickly facilitated.

An object of the invention is to provide a coffee machine having an open top can constituting the hot water reservoir so that in manufacture, maintenance, and repair, the heating element, thermocouple and water pipe connections are completely open and easily reachable on the inside of the can through the open top as well as on the outside of the can.

An object of the invention is to provide a pan superposed above the reservoir can preventing contamination of water in the can by dust, etc. and wherein the pan constitutes a receiver for water to be introduced to the can.

An object of the invention is to provide a cabinet for housing the can and for supporting other equipment such as the pan, stoves, coffee flasks, thermostats, electrical connections, etc.

An object of the invention is to provide a pan having at least its top above and outside the top of the cabinet so that water poured into the pan is not poured into the cabinet and so that there is no communication between interior of the pan and water in the pan and the interior of the cabinet.

An object of the invention is to removably cover the reservoir can open top with the pan bottom so that the bottom of the pan prevents steam and water vapor from circulating to the interior of the cabinet and wherein the bottom of the pan acts as a steam and water vapor condensation plate with the condensate dropping back into the can.

An object of the invention is to provide a cover for the pan to prevent contamination of the water in the pan and can from dust, etc. and also to cover the pan at its top as a condensation chamber for steam rising from the can.

An object of the invention is to provide an aperture in the bottom of the pan leading to the interior of the can and an aperture in the pan cover so that air, steam, or water vapor may pass through the pan bottom to the pan interior and to establish and maintain atmospheric pressure in the pan and in the can and to insure that water vapor does not flow between the can and the pan into the interior of the cabinet.

An object of the invention is to use the pan as a steam or water vapor condensing chamber above the reservoir can so that steam rising from the hot water in the can passes through the aperture in the pan bottom into the pan where it condenses to water in the pan and is recirculated back to the can thereby preventing loss of water from the can by evaporation and thus maintaining the water level in the can and also substantially eliminating water condensate inside the cabinet at the electrical connections, the heating elements, thermostat, and stoves internally of the cabinet.

An object of the invention is to provide a high loop in the siphon tube so that about a full flask of batch water is introduced to the can before the siphon tube transmits any water out of the can.

An object of the invention is to introduce all of substantially all the batch water to the reservoir can before any water is taken from the can to prevent circulatory channeling between the inlet pipe or dip tube opening at the bottom of the can and the siphon tube outlet opening midway in the can.

An object of the invention is to introduce the water to the reservoir can smoothly and without outlet flow influence or other influences so that if cold or cooler water is introduced to the can bottom it stays in the bottom of the can while only the hot water in the can rises above the outlet siphon tube thus quickly and easily establishing a quiet strata of hot water above the siphon tube inlet.

An object of the invention is to provide a baffle member in the reservoir water can adjacent the bottom of the can above the water inlet orifice or the open end of the water inlet tube to prevent cold water introduced into the can from mixing or stirring up the hot water in the can so that the cold water is held in the bottom of the can and the hot water stops at the top of the can.

An object of the invention is to siphon off the strata of hot water above the siphon tube inlet after the batch water has been introduced to the can so that the hot water may be removed from the can smoothly and quickly and introduced to the brew pot without disturbing the cold water in the bottom of the can and so that no turbulence or channeling flow occurs between the water inlet to the can and the water outlet from the can.

An object of the invention is to provide an optional construction so that the pan may be partially located in the cabinet, the pan located entirely outside the cabinet, the pan made removably attached to or removably resting on the can, and the can wholly or partially located in the cabinet, as desired and designed.

These and other objects of the invention will become readily apparent by reference to the following description of a coffeemaking machine of the invention embodying the novel structure, operation, and results taken in connection with the accompanying drawings, in which:

FIG. 1 is a front elevational view of a machine embodying the invention in operational condition with the brew pot in position, flasks on the stove heating elements, and a cover on the pan and showing the pan partially enclosed and leading through the top of the cabinet.

FIG. 2 is a top plan view of the machine seen in FIG. 1 with the top flask and pan cover removed looking down into the pan and showing the water outlet opening to the can and the event aperture in the bottom of the pan.

FIG. 3 is a view similar to FIG. 2 with the cabinet top and pan removed showing the open top can and equipment in the cabinet.

FIG. 4 is an enlarged front elevational showing of the upper portion of the machine of FIG. 1 with the front panel removed and bottom portion broken away showing the internal parts.

FIG. 6 is a view similar to FIG. 4 showing the pan entirely outside the cabinet and the can leading through the top of the cabinet with the pan removably resting on the can and having a dip tube leading to the bottom of the can.

FIG. 7 is a view somewhat similar to FIG. 6 showing the pan without a dip tube and showing a separate water inlet tube and funnel for introducing water to the can.

FIG. 8 is a cross sectional view of a portion of the pan and can showing an optional construction providing a vent between the can and the pan; and FIG. 9 is a bottom plan view of the pan of FIG. 8 showing the triangulated inset oval dimples which provide the vents.

Figure 5:
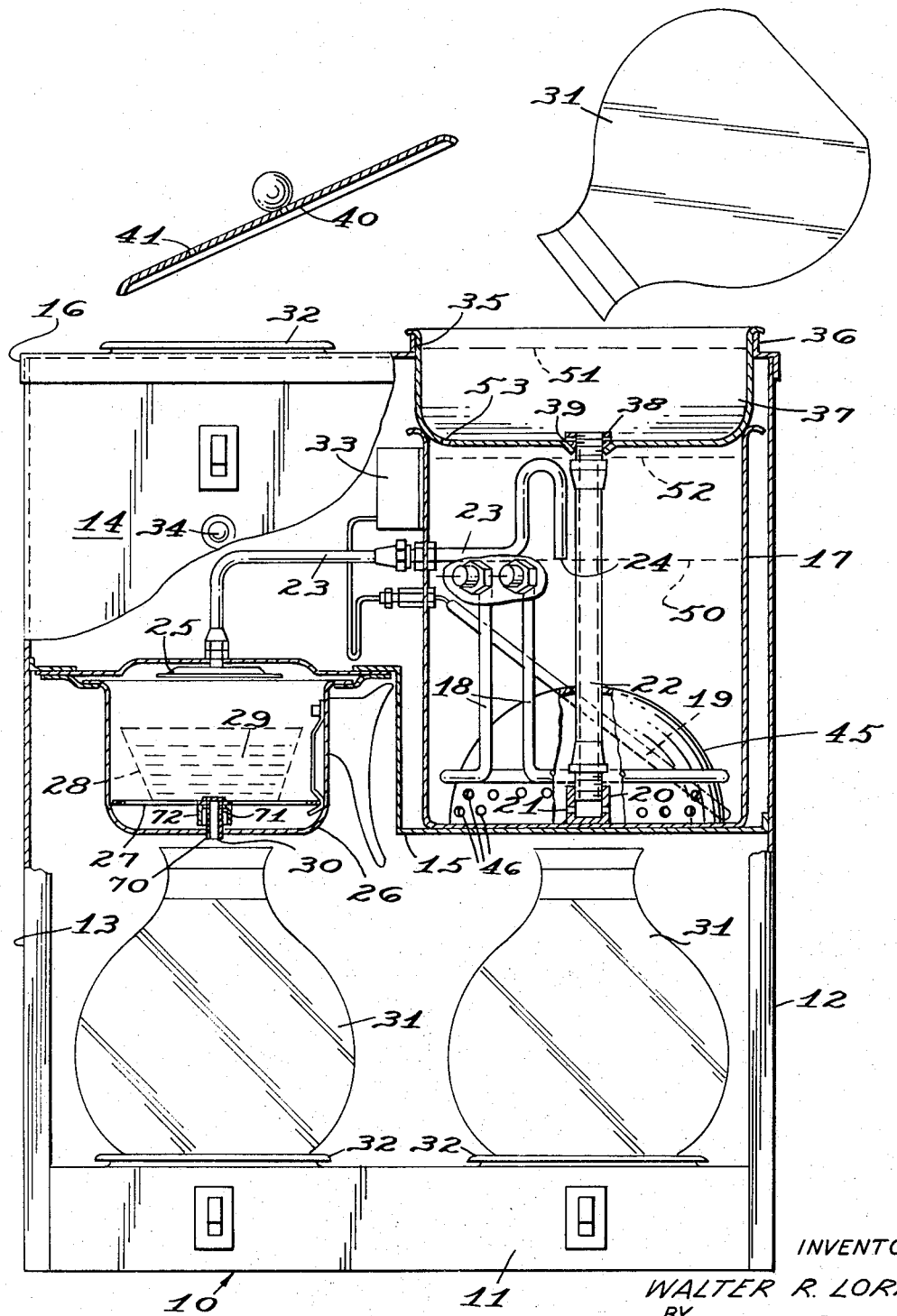
FIG. 5 is an enlarged vertical cross sectional view of the machine seen in FIGS. 1–4 and schematically illustrating introducing water and operation of the coffeemaker.

Referring now to the drawings wherein like numerals refer to like and corresponding parts throughout the several views, the novel coffeemaking machine disclosed therein to illustrate the invention comprises a cabinet 10 preferably made of welded stainless steel panels. The cabinet 10 has a base 11, side panels 12 and 13, a stepped front panel 14, a stepped intermediate transverse support panel 15, and a removable top panel 16. An open top water can 17 sits on the lower step of the support panel 15. A heating element 18 is positioned in and connected through the side wall of the can 17. A thermocouple 19 is positioned in and connected through the side wall of the can 17. A pipe fitting 20 may be welded to the bottom of the can 17. The fitting 20 may have a water inlet orifice 21.

A pipe 22 may lead to the fitting 20. An outlet water tube 23 lead through the side wall of the can 17 and preferably is equipped with a high loop siphon 24. The high loop siphon 24 may be inside or outside the can 17. A spreader head 25 is connected to the outer end of the outlet water tube 23. The spreader head 25 is mounted under the upper step of the support panel 15. A brew pot 26 is removably positioned below the spreader head 25. A perforate false bottom 27 in the brew pot 26 supports a filter cup 28 containing ground coffee 29 below the spreader head 25. An outlet orifice 30 in the bottom of the brew pot 26 emits brewed coffee. A flask 31 below the orifice 30 catches the brewed coffee. A stove element 32 on the base 11 supports the flask 31. A thermostat 33 is connected to the thermocouple 19. The heating element 18 in the can 17 is also connected to the thermostat 33. The thermostat 33 maintains the water in the can 17 at the desired adjusted temperature by controlling current to the heating element 18. When the water in the pan 17 is at the desired temperature, the thermostat energizes an operation lamp 34 advising the user that the system is ready.

The removable top panel 16 has a stove element 32 on one side and a large aperture 35 in the other side surmounted by an annular flange 36. A pan 37 lies in the aperture 35 and has a bottom which rests on the top of the can 17. The top of the pan 37 rises above the top edge of the annular flange 36. The pan 37 has an aperture in its bottom receiving the pipe 22. A nut 38 may be threaded on the pipe 22. The nut 38 has a transverse orifice 39 at the level of the bottom of the pan 37 to insure draining all the water out of the pan 37. A removable cover 40 rests on the top of the pan 37 preventing contamination of water in the pan by dust, etc. The cover 40 may have a small aperture 41 preventing the cover 40 from effecting a seal to the pan 37 in conjunction with water vapor or steam condensate. The top panel 16 may be secured to the cabinet by hinges and a sheet metal screw if desired. A stove element 32 may lie below the bottom step of the support member 15 and support a flask 31. The pan 37 may have an aperture 53 in its bottom providing communication between the pan 37 and the can 17.

The top of the pan 37 extends above the cabinet top panel 16 and overlaps the annular flange 36 on the top panel 16. Thus it is not possible to pour water into the interior of the cabinet 10. This also prevents liquid or matter on the top panel 16 from falling into the open top of the pan 37 or can 17. Thus wash water, spilled liquids, etc. will not run into the can 17, pan 37, and the interior of the cabinet 10. If the pan were below an aperture in the cabinet, wash water and other foreign material could and would fall into the pan and the interior of the cabinet.

A baffle 45 of suitable shape is positioned in the can 17 adjacent its bottom so that water is introduced to the can 17 below the baffle 45. The baffle 45 may be perforate. It may be spaced at its bottom edge from the bottom of the can 17 and be imperforate. The baffle may be cup shaped and have aperture 46. Thus the baffle prevents mixing and stirring but allows the introduced water to flow in smoothly and the hot water to rise in the can smoothly so that the hot water strata is established at the top of the can when water is added to the can 17 to make a batch of coffee.

A siphon tube element 70 leads to the aperture 30 in the bottom of the brew pot 26. An outlet aperture 71 in the tube 70 lies just below the perforate false bottom 27. An annular flange 72 lies around the tube 70 and aperture 71 and is spaced slightly from the bottom of the brew pot 26. The aperture 70 lets out less water than the spreader head 25 introduces to the brew pot. The siphon tube element 70 backs up water in the brew pot 26 to level of the false bottom 27 before it emits brewed coffee to the catch flask 31. The faster rate of water flow from the spreader head then causes the water in the brew pot to raise above the false bottom 27 to immerse the filter cup 28 and float the ground coffee 29 therein to insure complete wetting and brewing of the ground coffee 29. Thus no brewed coffee ever is introduced to the flask 31 during the time water is being introduced to the can 17.

Various modifications may be employed such as forming the pan 37 with a water inlet dip tube 22A integrally or welded thereto, similar to the pipe 22, leading to the bottom of the can 17, FIG. 6. The pan 37 may have one or more inset dimples 60, FIGS. 8 and 9, positionable on the top of the can 17 such as three dimples located 120° apart. This insures a vent between the pan 37 and the can 17 if desired. The cabinet top may also be lower, FIG. 6, leaving the pan 37 wholly exposed. But it is not recommended raising the cabinet top above the pan as this allows liquid, etc. to run into the interior of the cabinet and this is damaging to electrical apparatus and connections and it also allows steam to get into the interior of the cabinet.

The can 17 may be raised above the top 16 of the cabinet 10 or the cabinet top lowered below the top of the can 17, FIG. 6. A cover may be removably positioned on the can 17 so modified. Without employing a pan, a user then pours the batch water directly into the can 17 by removing the cover from the can 17.

In the embodiment of FIG. 6, the top of the can 17 lies outside the top panel 16A of the cabinet 10A. The pan 37A is removable relative to the can 17. Instead of an aperture 53 or 53A in the pan, the dip tube 22A may have a top breather aperture 53A. The cover 40 having the vent 41 is positioned on the pan 37A. When the pan 37A and tube 22A are removed, the cover 40 is positioned on the can 17. The pan 37A preferably is left resting on the can so that it acts as a condensation chamber.

In the embodiment of FIG. 7, the pan 37B has no dip tube but is provided with a breather and water return aperture 53B in its bottom providing communication between the interiors of the pan 37B and the can 17. A separate water inlet tube 22B is provided leading to the bottom of the can 17. The tube 22B may have an enlarged portion 22C for receiving and holding a funnel spout for introducing water to the can. In this embodiment the pan 37B acts only as a steam or water vapor condensation chamber as the batch water to the can is introduced through the separate inlet tube 22B.

The pans 37 and 37A have two distinct purposes. One is to hold batch water and introduce it to the can 17. The pans 37, 37A, and 37B have another purpose. This is to provide a condensation chamber for water vapor and steam rising from the hot water in the can 17 and to return the condensate in the can 17 to maintain the water in the can at the desired level just below the end of the siphon tube 24 of the water outlet tube 23.

Since the pan does not have a heating element and is partially if not wholly outside the cabinet 10, it is cooler than can 17. The water vapor and steam from the hot water in the can 17 enters the pan 37, 37A, and 37B through the apertures 53, 53A, and 53B. The pans 37, 37A, and 37B absorb and dissipate the heat of the steam or water vapor and it condenses to liquid on the interior of the pan 37 and the cover 40 and runs into the bottom of the pan 37 where it returns to the can 17 through the dip tubes 22 and 22A and/or the apertures 53, 53A, and 53B. Also a quantity of steam condenses on the bottom of the pan and falls directly back into the can 17.

The importance of the condensation chamber purpose of the pan is two-fold. First, it maintains the level of water in the can 17 substantially undepleted so that the quantity of water introduced to the can 17 is substantially the same as that coming from the can 17 through the outlet tube 23. Second, it substantially reduces the chance of the can 17 running dry from evaporation. It thus substantially eliminates the problem of burned-out heating elements in the event a thermostat malfunctions and the coffeemaker is left on over an extended period of time such as overnight or a day or two. With a stuck malfunctioning thermostat, the water boils continually and the can will soon run dry without the pan acting as a condensation chamber and returning the water to the can. The condensation chamber feature of the pan substantially eliminates a serious service problem.

In manufacture, the various elements are easily assembled. The cabinet 10 is completely formed. The thermostat 33, stove switches, stoves 32, operation lamp 34 are wired, and spreader head 25 is mounted. The wiring is connected. The can 17 is then inserted with all its accessory parts mounted. The can accessory connections are then made to the thermostat 33 and the spreader head 25. In the embodiment of FIGS. 1–5 the top panel 16 is closed and the pan 37 inserted in the opening 35 and the nut 38 screwed on the pipe 22. The cover 40 is placed on the pan 37. The device is now ready for use. In the embodiment of FIGS. 6 and 7 the top panel is closed relative to the can 17 and the pans 37A and 37B then placed on the can 17.

Any element or unit of the device may be cleaned, serviced, repaired, and/or replaced by simply removing the pan 37 and opening the top panel 16 of the cabinet 10. This is shown in FIG. 3 and is applicable to all embodiments. All parts and all the connections are completely open and easily worked on. In fact, both sides of all connections are exposed and accessible even inside the can.

In operation, the user initially fills the can 17 with water to the level indicated at dotted line 50. This occurs automatically as the siphon 24 establishes this level. A flask 31 may be used to collect any surplus water. The user then plugs in the electrical cord and sets the thermostat 33 for the desired water temperature. Upon the water attaining the desired temperature, the thermostat 33 deenergises the heating element 18 and energises the lamp 34. This advises the user that the water is hot. The thermostat 33 and thermocouple 19 maintains the water at the desired temperature.

The user places the filter cup 28 and ground coffee 29 in the brew pot 26 and positions the brew pot 26 below the spreader head 25. The user places a brewed coffee flask 32 below the brew pot outlet aperture 30. The user then removes the pan cover 40 and pours a flask 32 full of water, hot or cold, into the pan 37 or 37A and replaces the pan cover 40. In the embodiment of FIG. 7, the pan 37B is by-passed and the water introduced to the can 17 through the dip tube 22B such as by using a funnel. The coffee is then brewed. A full flask 31 of water is poured into the pan 37 or into the can 17. If less than a full flask 31 of water is used, the level will not rise above the top of the high loop of the siphon tube 24 and thus the hot water will not be delivered from the can 17. This insures that a full flask will be poured in and that the water level of the can is maintained at 50 so that no partial flask brewing occurs.

The water in the pan 37 or 37A runs down the pipe 22 or dip tube 22A to the bottom of the can 17 or the water is poured into the dip tube 22B. Thus if cold water is poured into the can 17, it is introduced to the can 17 remote from the outlet tube 23. The baffle 45 aids in holding the cooler water in the bottom of the can and lets the hot water in the can 17 move to the top of the can 17. This causes the hot water in the can 17 to rise to the level indicated at dotted line 52 which level is above the top of the siphon tube 24. Thus substantially all the batch water flows into the can smoothly and quickly before the siphon tube activation level is reached. This causes a strata of hot water to rise in the can and retains the cold water in the bottom of the can. At the end of water inlet flow the siphon tube 24 is filled and activated. It delivers the raised strata of hot water to the outlet tube 23 and spreader head 25.

No channelling occurs between the inlet pipe and the outlet tube in the can due to the fact that they operate at different times. Conversely if they did operate at the same time, the low pressure of the outlet and the high pressure of the inlet would seek one another and channelling would occur. Thus, first, water is introduced and the strata of hot water is raised above the siphon tube without outlet flow turbulance and channelling. Then second, the hot water strata above the siphon tube end is taken from the can without inlet flow turbulence and channelling. The siphon tube 24 delivers water to the spreader head 25 until all the strata of hot water in the can 17 above the end of siphon tube 24 is fed to the brew pot 26 and until the siphon tube 24 lowers the hot water strata level in the can 17 below the siphon tube 24, such as indicated at 50. Water delivery to the spreader head 25 and brew pot 26 then stops. During the outlet operation the spreader head 25 continually disperses hot water over the ground coffee 29 in the filter cup 28 in the brew pot 26. The brewed coffee runs out the outlet orifice 30 in the brew pot 26 into the flask 31. The brewed coffee is then used.

The water level in the can 17 may rise and fall at ambient atmospheric pressure as air may escape and enter between the can 17 and the pan 37 and through the apertures 53, 41, 53A, and/or 53B. This facilitates and insures proper flow of water without interference from high or low pressures within the can 17. Should condensate fill the space between the can 17 and the pan 37, the aperture 53, 53A, or 53B in the pan 37, 37A, and 37B and the aperture 41 in the pan cover 40 insure ambient atmospheric pressure in the can 17. If desired a dimple 60 or similar vent may be used between the can 17 and the pan 37.

During idle periods, such as between meal times and at night and over week ends, the system may be kept energized and the water hot without evaporating any substantial quantity of water or only a minute quantity of water. This feature results from the apertures 53, 53A, and 53B in the pan 37 and the aperture 41 in the pan cover 40 permitting any steam or vapor rising from the water in the can to flow readily into the pan 37, 37A, and 37B. The apertures form a steam channel into the pan. The pan acts as a condensation chamber for the steam or water vapor and the condensate is returned to the can 17. Thus any water escaping from the can in the form of steam or vapor flows into the pan, is condensed, and is returned to the can 17. This maintains the water in the can 17 substantially without depletion over a relatively long period of time.

The steam or water vapor channel into the pan also substantially completely eliminates any steam or water vapor inside the cabinet. This is a great advantage and preserves the electrical units and wiring against rust and prevents shorting out and malfunctions.

While only a few embodiments of the novel simplified coffeemaking machine have been shown and described in detail, it is obvious that many changes and modifications may be made in the size, shape, detail and arrangement of the various elements of the invention within the scope of the appended claims.

I claim:
1. A simplified coffeemaking machine comprising,
a cabinet,
a water spreader head on said cabinet,
a brew pot removably mountable on said cabinet below said spreader head for containing ground coffee;
said cabinet normally supporting a catch flask;
said brew pot having an open top for receiving hot water from said spreader head and a bottom aperture for emitting brewed coffee to a catch flask positioned below said brew pot,
an open top hot water reservoir can in said cabinet,
an electrical water heating element in said cabinet at said can for heating water in said can;
an outlet water tube leading from said can to said spreader head from a point spaced below said open top of said can and above the bottom of said can;
said outlet water tube draining water in said can down to the level of said tube to establish the normal hot water reservoir supply of said can;
said can having a sufficient capacity above said outlet water tube to receive a quantity of water to make a batch of coffee;
the user pouring a quantity of water into said can equal to the batch of brewed coffee whereupon the water in said can is raised above said outlet tube;
said outlet tube draining water in said can above said outlet tube down to the level of said tube thereby supplying hot water from said can through said outlet tube and said spreader head to said brew pot to make the brewed coffee and to re-establish the reservoir water level in said can at said outlet tube;
a pan superposed over said can for receiving water poured by the user;
an inlet pipe leading from the bottom of said pan to the bottom of said can to channel batch water poured into said pan to the bottom of said can;
said pipe having a bottom aperture adjacent the bottom of said can and a top aperture just below said pan providing a breather vent between the interior of said pan and the interior of said can; and
a cover on said pan having an aperture;
said pipe breather aperture and said cover vent aperture insuring that atmospheric pressure is communicated to said can through said pan, pipe and apertures;
a user pouring batch water directly into said pan whereupon said poured batch water is delivered by said pipe from said pan to the bottom of said can and the hot water in said can rises above said outlet tube and is conducted by said outlet tube to said spreader head and introduced to said brew pot; said pipe, pan and apertures providing a steam and water vapor condensation chamber above said can.

2. A simplified coffeemaking machine comprising,
a cabinet,
a water spreader head on said cabinet,
a brew pot removably mountable on said cabinet below said spreader head for containing ground coffee;
said cabinet normally supporting a catch flask;
said brew pot having an open top for receiving hot water from said spreader head and a bottom aperture for emitting brewed coffee to a catch flask positioned below said brew pot,
an open top hot water reservoir can in said cabinet,
an electrical water heating element in said cabinet at said can for heating water in said can;
an outlet water tube leading from said can to said spreader head from a point spaced below said open top of said can and above the bottom of said can;
said outlet water tube draining water in said can down to the level of said tube to establish the normal hot water reservoir supply of said can;
said can having a sufficient capacity above said outlet water tube to receive a quantity of water to make a batch of coffee;
the user pouring a quantity of water into said can equal to the batch of brewed coffee whereupon the water in said can is raised above said outlet tube;
said outlet tube draining water in said can above said outlet tube down to the level of said tube thereby supplying hot water from said can through said outlet tube and said spreader head to said brew pot to make the brewed coffee and to re-establish the reservoir water level in said can at said outlet tube;
a pan superposed over said can for receiving water poured by the user;
an inlet pipe leading from the bottom of said pan to the bottom of said can to channel batch water poured into said pan to the bottom of said can;
said pipe having a bottom aperture adjacent the bottom of said can and a top aperture just below said pan providing a breather vent between the interior of said pan and the interior of said can; and
a cover on said pan having an aperture;
said pipe breather aperture and said cover vent aperture insuring that atmospheric pressure is communicated to said can through said pan, pipe and apertures;
a user pouring batch water directly into said pan whereupon said poured batch water is delivered by said pipe from said pan to the bottom of said can and the hot water in said can rises above said outlet tube and is conducted by said outlet tube to said spreader head and introduced to said brew pot;
said pipe, pan and apertures providing a steam and water vapor condensation chamber above said can;

a baffle member in said tank above said inlet pipe bottom aperture reducing mixing, stirring, and turbulance in the hot water in said can when water is introduced to said can so that the hot water in said can rises to the top of said can as a hot water strata at said outlet tube for delivery to said spreader head.

3. A simplified coffeemaking machine comprising,
a cabinet,
a water spreader head on said cabinet,
a brew pot removably mountable on said cabinet below said spreader head for containing ground coffee;
said cabinet normally supporting a catch flask;
said brew pot having an open top for receiving hot water from said spreader head and a bottom aperture for emitting brewed coffee to a catch flask positioned below said brew pot;
an open top hot water reservoir can in said cabinet;
an electrical water heating element in said cabinet at said can for heating water in said can;
an outlet water tube leading from said can to said spreader head from a point spaced below said open top of said can and above the bottom of said can;
said outlet water tube draining water in said can down to the level of said tube to establish the normal hot water reservoir supply of said can;
said can having a sufficient capacity above said outlet water tube to receive a quantity of water to make a batch of coffee;
the user pouring a quantity of water into said can equal to the batch of brewed coffee whereupon the water in said can is raised above said outlet tube;
said outlet tube draining water in said can above said outlet tube down to the level of said tube thereby supplying hot water from said can through said outlet tube and said spreader head to said brew pot to make the brewed coffee and to re-establish the reservoir water level in said can at said outlet tube;
a pan superposed on said can having a vent aperture in its bottom providing communication between the interiors of said can and pan; and
a cover on said pan having a vent aperture,
said pan and cover in conjunction with said apertures communicating with said can condensing steam and water vapor rising from said can and returning it to said can as condensate.

4. A simplified coffeemaking machine comprising,
a cabinet,
a water spreader head on said cabinet,
a brew pot removably mountable on said cabinet below said spreader head for containing ground coffee;
said cabinet normally supporting a catch flask;
said brew pot having an open top for receiving hot water from said spreader head and a bottom aperture for emitting brewed coffee to a catch flask positioned below said brew pot,
an open top hot water reservoir can in said cabinet,
an electrical water heating element in said cabinet at said can for heating water in said can;
an outlet water tube leading from said can to said spreader head from a point spaced below said open top of said can and above the bottom of said can;
said outlet water tube draining water in said can down to the level of said tube to establish the normal hot water reservoir supply of said can;
said can having a sufficient capacity above said outlet water tube to receive a quantity of water to make a batch of coffee;
the user pouring a quantity of water into said can equal to the batch of brewed coffee whereupon the water in said can is raised above said outlet tube;
said outlet tube draining water in said can above said outlet tube down to the level of said tube thereby supplying hot water from said can through said outlet tube and said spreader head to said brew pot to make the brewed coffee and to re-establish the reservoir water level in said can at said outlet tube;
a pan on said cabinet higher than said can having an opening in the bottom thereof;
a dip pipe leading from said pan bottom opening to a point adjacent the bottom of said can;
a user pouring a quantity of water for a coffee batch into said pan;
said dip pipe transferring the water in said pan to said can at the bottom of said can so that if cold water is poured it is introduced to said can at the bottom thereof remote from said outlet water tube so that the cold water stays adjacent the bottom of said can and the hot water rises above said outlet water tube;
a high siphon loop in said outlet tube blocking water flow from said can until the water level of said can rises above said high siphon loop;
said high siphon loop preventing inflow of water to said can concurrent with outflow of water from said can so as to substantially isolate inflow and outflow from one another so that turbulence and channelling is substantially eliminated and the cold and hot water strata of the can smoothly and quickly established;
said pan having a bottom resting on said can so as to prevent water vapor from escaping from said can;
said pan bottom having a vent aperture through which water vapor from said can may enter into said pan and through which water vapor condensate in said pan may re-enter said can;
said pan acting as a relatively cool condensing chamber for water vapor emanating from said can;
a cover on said pan having a vent aperture;
said vent apertures in said pan cover and said pan maintaining atmospheric pressure conditions in said can in the event a seal occurs between said can and said pan such as may be occasioned by condensate sealing the space between said can and said pan; and
an inlet pipe leading from said pan to the bottom of said can for introducing water poured into said pan to the bottom of said can.

5. A simplified coffeemaking machine comprising,
a cabinet,
a water spreader head on said cabinet,
a brew pot removably mountable on said cabinet below said spreader head for containing ground coffee;
said cabinet normally supporting a catch flask;
said brew pot having an open top for receiving hot water from said spreader head and a bottom aperture for emitting brewed coffee to a catch flask positioned below said brew pot,
an open top hot water reservoir can in said cabinet,
an electrical water heating element in said cabinet at said can for heating water in said can;
an outlet water tube leading from said can to said spreader head from a point spaced below said open top of said can and above the bottom of said can;
said outlet water tube draining water in said can down to the level of said tube to establish the normal hot water reservoir supply of said can; said can having a sufficient capacity above said outlet water tube to receive a quantity of water to make a batch of coffee;
the user pouring a quantity of water into said can equal to the batch of brewed coffee whereupon the water in said can is raised above said outlet tube;
said outlet tube draining water in said can above said outlet tube down to the level of said tube thereby supplying hot water from said can through said outlet tube and said spreader head to said brew pot to make the brewed coffee and to re-establish the reservoir water level in said can at said outlet tube;
a high siphon loop in said outlet tube;
said cabinet having a top panel;
said top panel having an aperture over said can;
a pan lying in said aperture of said top panel;

said pan having a bottom resting on said open top of said can, a top on said pan lying outwardly of said top panel, and said bottom on said pan having an aperture;

a pipe fitting in said can bottom;

a pipe having a bottom end threaded in said fitting and a top end lying in said aperture of said pan;

a nut threaded on said pipe top end holding said pan in assembled position on said cabinet in said top panel aperture;

an orifice in one said pipe and fitting adjacent said can bottom;

water poured in said pan flowing through said pipe to said can bottom through said orifice causing the water level in said can to rise above said outlet tube high loop siphon portion whereupon water flows out said outlet tube to said spreader head and said brew pot;

said water heating element being immersed in said can and connected through the side of said can;

said outlet water tube being connected through the side of said can;

a thermocouple connected through the side of said can;

fittings on the inside and outside of said can at said outlet tube, heating element, and thermocouple;

said fittings being readily accessible in manufacture and for cleaning, repair, and replacement through said cabinet top, said aperture of said top panel on said cabinet, and through the open top of said can by removing said pan;

a thermostat in said cabinet having switches;

a ready lamp on said cabinet, said heating element, thermocouple, and ready lamp being connected to said switches of said thermostat;

said thermostat upon said thermocouple signaling that said water is desirably hot, switching out said heating element and switching in said ready lamp advising the operator that the water is desirably hot and the machine ready to operate;

said thermostat being adjustable so that its switching temperature may be varied as desired by the operator;

a cover on said pan;

said pan and said cover having a small aperture so that atmospheric pressure is communicated to said can;

said pan acting as a condensing chamber for said can to reduce water vapor from said can to water condensate and to then reintroduce said water condensate to said can through said aperture in said pan bottom and said water pipe to maintain the water supply of said can substantially without depletion;

said high loop siphon preventing outflow of water from said can concurrent with inflow of water to said can to first establish a high strata of hot water in said can and to then transmit the high strata of hot water to said spreader head.

References Cited
UNITED STATES PATENTS

| | | | |
|---|---|---|---|
| 2,422,492 | 6/1947 | Losee | 99—300 |
| 3,220,334 | 11/1965 | Martin | 99—282 |
| 3,261,279 | 7/1966 | Kaplan et al. | 99—307 |

ROBERT W. JENKINS, *Primary Examiner.*

WALTER A. SCHEEL, *Examiner.*